July 20, 1965

G. F. A. DAUMY 3,195,573

COCKS FOR FLUIDS

Filed Jan. 29, 1963

INVENTOR:
GEORGES FRANCIS ALEXIS DAUMY
BY Irvin S. Thompson
ATTORNEY

July 20, 1965  G. F. A. DAUMY  3,195,573
COCKS FOR FLUIDS

Filed Jan. 29, 1963  2 Sheets-Sheet 2

INVENTOR:
GEORGES FRANCIS ALEXIS DAUMY
BY Irvin D. Thompson
ATTORNEY

United States Patent Office 3,195,573
Patented July 20, 1965

3,195,573
COCKS FOR FLUIDS
Georges Francis Alexis Daumy, Seyssins, France, assignor to Robinetterie Industrielle Pour le Batiment, le Sanitaire et les Applications Nucleaires R.I.B.S.A.N., Grenoble (Isere), France, a corporation of France
Filed Jan. 29, 1963, Ser. No. 254,770
Claims priority, application France, Feb. 13, 1962, 4,434; May 8, 1962, 896,814
20 Claims. (Cl. 137—625.4)

The present invention relates to cocks for fluids such as gas, vapours, liquids or heteregenous mixtures capable of being conveyed by piping systems.

The invention is concerned more precisely with cocks comprising a fixed body in which is formed a chamber with a circular section at which terminate at least two fluid passages, each connected to a conduit, and of which at least one is constituted by an orifice formed in the lateral wall of the said chamber, a hand-lever external to the fixed body and rigidly fixed to an operating rod which passes axially through one of the transverse walls of the chamber, fluid-tight means between this transverse wall and the operating rod, a deformable sleeve arranged coaxially in the interior of the chamber, means for coupling the said sleeve to the fixed body, intended to prevent angular or axial displacement of the sleeve in the chamber, and a rigid cam provided in the interior of the said sleeve and rigidly fixed to the operating rod, the profile of the said cam being chosen in such manner that the rotation of the cam about the axis of the chamber results in a deformation of the sleeve for the purpose of ensuring the opening of the lateral orifice or on the contrary its closure, by the application of a portion of the sleeve against the delivery outlet of the said orifice.

In the known cocks of this kind, the cam tends to carry the sleeve with it in its rotation, which produces a torsional movement of this sleeve. The result is that each closing or opening operation of the lateral orifice is accompanied by slip of the outer surface of the sleeve on the lateral wall of the chamber and this slip results in wear of the sleeve after a certain number of cycles of operation.

The present invention has for its particular object to eliminate this disadvantage.

It has also for its object to produce a cock which is economical in construction, and the assembly and dismantling of which are furthermore particularly simple.

A cock according to the invention is characterized in that the deformable sleeve comprises an inner element for reducing friction, constituted by a flexible tubular sheath passed over the cam and made of a material having a low coefficient of friction, together with an outer closure element applied against the outer surface of the inner element facing the lateral orifice, and made from a flexible material having great elasticity.

The cam can thus rotate inside the flexible tubular sheath without carrying the sleeve with it in rotation. It follows that during each operation of closure or opening of the lateral orifice, the outer closure element moves closer to or away from the lateral wall of the chamber with a strictly radial movement of each of its points, that is to say without any slip of this outer element on the lateral wall of the chamber.

In accordance with a preferred form of embodiment of the cock according to the invention, the transverse wall through which passes the operating rod being formed by a cover assembled to the lateral wall of the chamber with the interposition of fluid-tight means between this cover and the lateral wall on the one hand and between this cover and the operating rod on the other, the said fluid-tight means and also the means for coupling the sleeve to the fixed body form a single member with the flexible tubular sheath, which for that purpose is provided at one extremity with an outer coupling and sealing flange gripped between the cover and the lateral wall and, at its other extremity, with a fluid-tight base which covers the free extremity of the cam.

This arrangement results in a simple and economical construction of the cock and ensures rapid and easy dismantling and re-assembly of the various parts which constitute the cock.

The characteristic features and advantages of the invention will furthermore be brought out in the description which follows below by way of example, reference being made to the accompanying drawings, in which.

Figure 1:
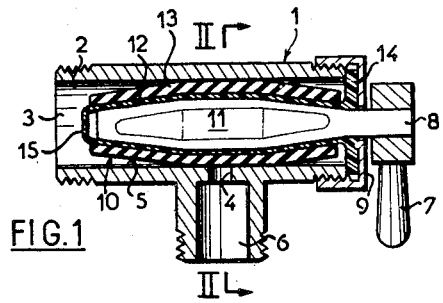
FIG. 1 represents a cock according to the invention for the position of closure, in axial cross-section taken along the line I—I of FIG. 2.

The cock shown in FIGS. 1 to 4 comprises a fixed body 1 in which is formed a cylindrical chamber 2 in which terminate an admission passage constituted by an open extremity 3 of the chamber 2, and an evacuation passage formed by an orifice 4 cut in the cylindrical lateral wall 5 of the chamber 2 and coupled to a radial evacuation conduit 6. A hand-lever 7 on the outside of the body 1 is rigidly fixed to an operating rod 8 which passes axially through a cover 9 constituting a transverse end wall of the chamber 2 and assembled by screwing to the cylindrical wall 5 of the said chamber. A deformable sleeve 10 arranged inside the chamber 2 surrounds a rigid rotary cam 11 which is rigidly fixed to the operating rod 8.

The sleeve 10 is formed in two portions, namely an internal portion 12 for reducing friction and an external closure portion 13.

The internal portion 12 is formed by a flexible tubular sheath passed over the cam 11 and made of a material having a low coefficient of friction, for example of polyamide of the type known by the name of "RILSAN" which is polymerized 11 aminoundecanoic acid as described in "Chemical Abstracts," vol. 50, p. 9057 (1956) or of any other thermoplastic synthetic substance having similar properties. This tubular sheath is provided at one extremity with an external coupling and fluid-tight sealing flange 14 strongly clamped between the cover 9 and the cylindrical wall of the chamber, and at its other extremity with a fluid-tight base 15 which closes the free extremity of the cam 11.

The outer closure element 13 is constituted by a ring or a sheath passed over the internal element 12, and made of a flexible material having great elasticity, for example from a natural or synthetic rubber.

Figure 2:
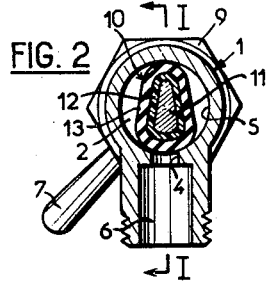
FIG. 2 shows this same cock, also for the position of closure, in transverse section taken along the line II—II of FIG. 1.
Figure 4:
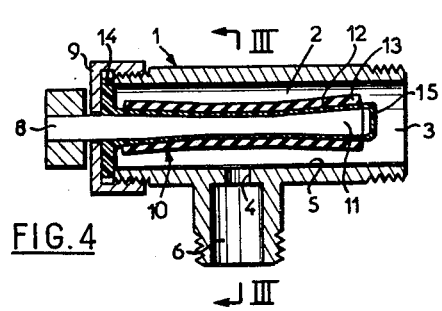
FIG. 4 shows the same cock, also in the position of opening, in axial cross-section taken along the line IV—IV of FIG. 3.
Figure 3:
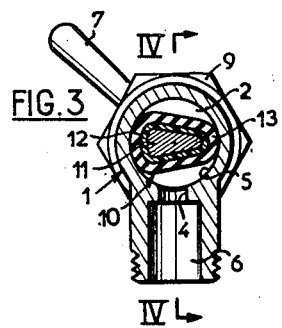
FIG. 3 is a cross-section similar to FIG. 2, but with the cock in the position of opening, the section being taken along the line III—III of FIG. 4.
Figure 5:
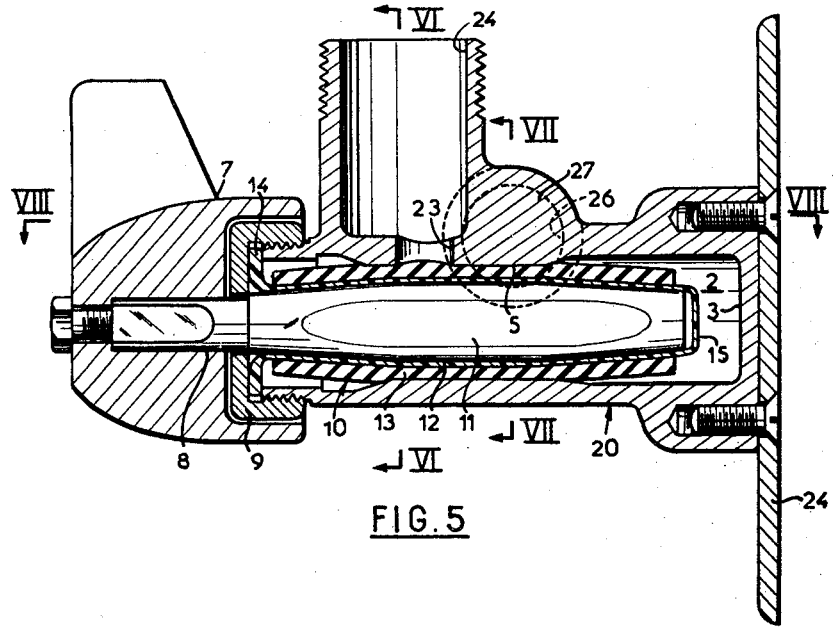
FIG. 5 is an axial section of one form of construction of a mixer-cock constructed in accordance with the invention.
Figure 6:
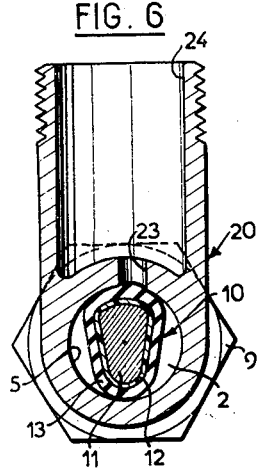
FIG. 6 is a transverse section of this mixer-cock taken along the line VI—VI of FIG. 5, with the operating hand-lever removed.
Figure 7:
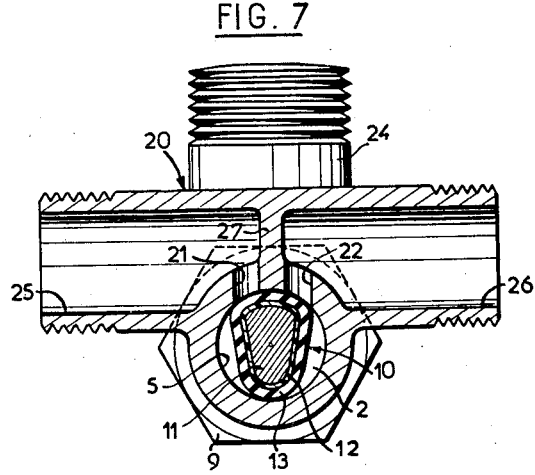
FIG. 7 is a transverse section of the same mixer-cock, taken along the line VII—VII of FIG. 5, also with the operating hand-lever removed.

The profile of the cam 11 is chosen in such manner that the rotation of this cam about the axis of the chamber 2 by acting on the hand-lever 7, causes a deformation of the sleeve 10 so as to ensure the opening of the evacuation orifice 4 (FIGS. 3 and 4) or on the contrary to close this orifice by the application of part of this sleeve against the periphery of the orifice (FIGS. 1 and 2).

By virtue of the immobilization of the flange 14 of the sheath 12 in the fixed body of the cock and by the choice of the material which constitutes this sheath, the cam 11 can rotate inside the sleeve 10 without driving the sleeve in rotation and without giving rise to any torsion of the sleeve. It follows that, during each operation of closure or opening of the evacuation orifice 4, the external element 13 comes closer to or moves away from the cylindrical wall 5 of the chamber 2 with a strictly radial movement of each of its points, that is to say without any slip of this external element 13 on the cylindrical wall of the chamber. Furthermore, the choice of the material which constitutes the external element 13 ensures an excellent closure of the orifice 4 for the closed position of the cock.

The facility of assembly and dismantling of the parts constituting the cock will be clearly appreciated, as will also the reduced number of those parts. This reduction in the number of parts, which permits of a particularly economical manufacture, has been possible by the fact that the flexible sheath 12 for reducing friction combines a number of functions. In fact, this sheath constitutes a coupling member between the sleeve 10 and the fixed body, preventing any radial or axial displacement of this sleeve inside the fixed body; in addition, through its flange 14, it forms a fluid-tight sealing means between the cover 9 and the cylindrical wall 5 of the chamber 2; furthermore, since this sheath has a closed base 15, it forms a fluid-tight sealing device between the cover 9 and the operating rod 8.

The cock shown in FIGS. 5 to 8 is provided with internal members similar to those of the cock shown in FIGS. 1 to 4. In a cylindrical chamber 2, a rotary cam 11 fixed to an operating rod 8 is enclosed by a sleeve 10 comprising an outer closure member 13 and an inner member 12 for reducing friction, this member 12 being constituted by a tubular sheath comprising a fluid-tight base 15 and a flange 14 gripped under a cover 9 through which passes the rod 8.

The cock shown in FIGS. 5 to 8 is arranged as a mixer-cock and its fixed body 20 is provided to that end with two admission passages 21 and 22 and a fluid-evacuation passage 23, these passages being all three constituted by orifices formed in the cylindrical wall 5 of the chamber 2 and angularly displaced with respect to the axis of that chamber. The extremity 3 of the chamber 2 is closed in this case by a transverse wall which can be applied against a plate 24 (FIG. 5) with the object of facilitating the fixing of the cock on a wall or other surface.

Figure 8:
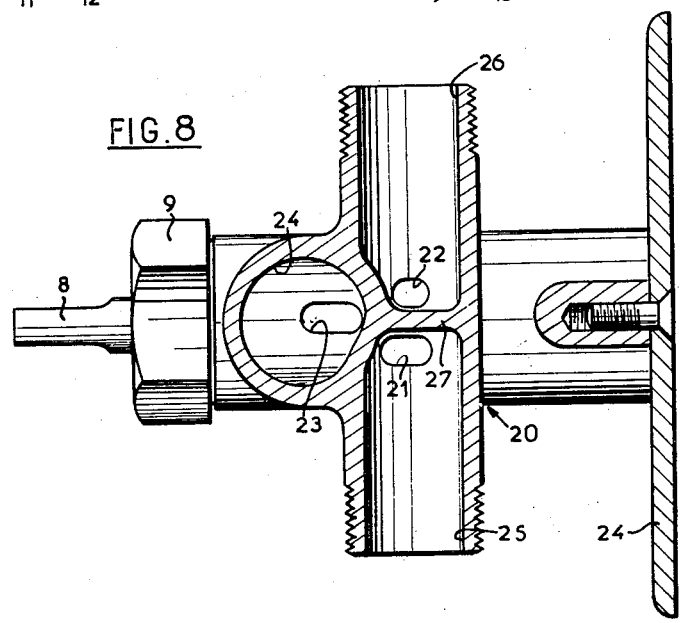
FIG. 8 is a horizontal section of the mixer-cock, taken along the line VIII—VIII of FIG. 5, again with the operating lever handle removed.

The three orifices 21, 22 and 23 are fairly close together angularly in order that the outer element 13 of the sleeve 10 may ensure the simultaneous closure of at least two of these orifices under the action of the cam 11 (FIGS. 6 and 7), the evacuation orifice 23 being located angularly between the admission orifices 21 and 22. These admission orifices are arranged substantially in a single plane transverse to the chamber 2, while the evacuation orifice 23 is displaced in the axial direction with respect to this plane (see FIG. 8). The orifices 21, 22 and 23 have the form of rectangles elongated in the axial direction and having all three the same width, whereas their length is proportional to the section of passage desired for each orifice, the length of the evacuation orifice being of course greater than that of the admission orifices. The rectangles forming the orifices are all three rounded-off at their corners, as shown in FIG. 8.

The evacuation orifice 23 communicates with an evacuation conduit 24 disposed radially with respect to the chamber 2 and forming a single piece with the fixed body 20, while the admission orifices 21 and 2 communicate respectively with two admission conduits 25 and 26 located in a single plane transverse to the chamber and axially displaced with respect to the evacuation conduit 24, these conduits 25 and 26 being also in one piece with the body 20. As shown, the admission conduits 25 and 26 are preferably located in line with each other in a direction perpendicular to the evacuation conduit 24, and are separated by a partition 27 arranged in a plane intermediate between the two admission orifices 21 and 22.

Figure 9:
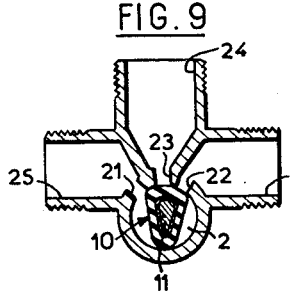
FIGS. 9 and 10 are diagrammatic transverse sections which explain the operation of the mixer-cock of FIGS. 5 to 8.
Figure 10:
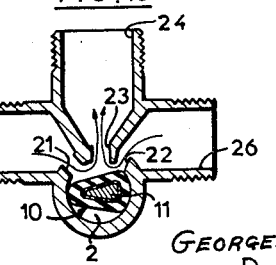

The operation of the mixer-cock of FIGS. 5 to 8 is explained diagrammatically by FIGS. 9 and 10.

When the cam 11 is in the position indicated in FIG. 9, it applies the sleeve 10 against the orifices 22 and 23. The evacuation orifice 23 is closed and all communication is interrupted between the admission orifices 21 and 22. The cock is thus closed.

Rotation of the cam 11 by a fraction of a turn in the clockwise direction first results in a gradual opening of the evacuation orifice 23 and puts this latter into communication with the admission orifice 21. If the conduit 25 is an incoming supply of cold water, this cold water passes through 21 and 23 to the evacuation conduit 24.

If rotation of the cam 11 is continued, the other admission orifice 22 is progressively opened and the fluid admitted through the conduit 26 is permitted to pass to the evacuation conduit 24. If this conduit 26 is supplied with hot water, it is a mixture of cold water and hot water, namely lukewarm or warm water, which flows into the evacuation conduit 24.

By continuing still further the rotation of the cam 11, the orifice 21 is progressively closed, thereby reducing the flow of cold water, until only hot water is finally obtained at 24 when the orifice 21 is completely closed by the sleeve 10.

It will be observed that the composition of the mixture varies progressively with the rotation of the cam 11. This gradual variation is due, not only to the relative angular arrangement adopted for the orifices 21, 22 and 23, but also to the rounded form of the corners of the rectangles which constitute these orifices. There is thus obtained a very flexible method of regulation by the single operation of the cam 11.

The mixer-cock of FIGS. 5 to 8 also possesses all the qualities enumerated above in connection with the cock of FIGS. 1 to 4: strength and safety, simple and economical construction, and easy assembly and dismantling of its parts.

What I claim is:

1. A cock or faucet for fluids comprising a fixed body having walls including a circumferential wall defining a chamber of circular cross section, and provided with at least two fluid passages one of which embodies a port formed in said circumferential wall of the chamber, a flexible sleeve disposed coaxially in the interior of said chamber, means for coupling said sleeve to said fixed body including means to prevent angular and axial displacement of the sleeve in said chamber, a rigid cam disposed in the interior of said sleeve and substantially filling said sleeve and supporting and having area contact with said sleeve, said cam having a profile selected so that rotation of said cam about the axis of said chamber causes a deformation of said sleeve so as to open said port formed in said circumferential wall and produces application of a portion of said sleeve against said port to close said port, said flexible sleeve comprising an internal element for reducing friction and an external closure element applied to the outer surface of said internal element facing said port, said internal element being of a flexible material having a low coefficient of friction and being coupled to said body by said coupling means, and said external element being of a flexible material having great elasticity, and means on the exterior of said body for rotating said cam.

2. A cock according to claim 1 in which a stem is interposed between the cam and the means for rotating the cam, one end of the chamber is open and provided with a closure through which the stem extends, said closure serving as the means for coupling the sleeve to the body and cooperating with the sleeve for sealing the stem in the body.

3. A cock as claimed in claim 1, in which the external element of said flexible sleeve comprises a ring embracing said internal element.

4. A cock as claimed in claim 1, in which the material of said internal element is a polyamide of 11 amino-undecanoic acid.

5. A cock as claimed in claim 1, in which the material of the external element is selected from the group consisting of natural rubber.

6. A cock as claimed in claim 1 provided with two inlet ports and one outlet port in the circumferential wall for the fluid, said ports being angularly disposed with respect to the axis of said chamber.

7. A cock as claimed in claim 6, in which the three angularly-disposed ports are located fairly close together and in which the external element of said sleeve can ensure the simultaneous closure of at least two of said ports, under the action of said cam.

8. A cock as claimed in claim 7, in which said outlet port is located angularly between the two said inlet ports.

9. A cock as claimed in claim 8, in which said two inlet ports are located substantially in a single plane transverse to said chamber, while the outlet port is displaced in the axial direction with respect to said plane.

10. A cock as claimed in claim 9, in which said three ports have practically the form of rectangles elongated in the axial direction and have all three the same width, whereas their lengths are proportional to the section of passage desired for each port, the length of said outlet port being greater than the length of said inlet ports.

11. A cock as claimed in claim 10, in which said rectangles forming the ports are rounded-off at their corners.

12. A cock as claimed in claim 9, in which an outlet conduit coupled to said outlet port is disposed radially with respect to said chamber, while two inlet conduits coupled respectively to the two inlet ports are located in the same plane transverse to the chamber and displaced in the axial direction with respect to said outlet conduit.

13. A cock as claimed in claim 12, in which said inlet conduits are arranged in line with each other in a direction perpendicular to said outlet conduit, and are separated by a partition disposed in an intermediate plane between the two said inlet ports.

14. A faucet having:
 a body in which is formed a chamber of circular cross section having an axis, with a plurality of fluid passages, one of which at least is formed laterally of said axis;
 a flexible resilient sleeve disposed coaxially within said chamber;
 a tubular element made of a flexible material disposed coaxially within said sleeve, the outer surface of said element being in substantaily close contact with the inner surface of said sleeve;
 a cam disposed coaxially within and supporting and substantially filling said tubular element, the outer surface of said cam being in area contact with the inner surface of said element;
 means for fixing said tubular element to said body against rotational and axial movements;
 and means for rotating said cam about said axis, within said tubular element, whereby said sleeve is subjected to a variable radial deformation and produces a variable contact between the outer surface of said sleeve and the inner surface of said chamber.

15. A faucet as claimed in claim 14, wherein the means for fixing said tubular element include a flange formed at one end of said element, and wherein said chamber has a coaxial opening formed at the chamber-end corresponding to said flange, with a cover for said opening, said flange being clamped between said cover and the external face portion of said body surrounding said opening.

16. A faucet as claimed in claim 15, wherein said tubular element is closed at its end opposite said flanged end.

17. A faucet as claimed in claim 16, wherein said tubular element of flexible material has low-friction characteristics.

18. A faucet having:
 a hollow body having a lateral casing and a peripheral end surface, with a plurality of fluid passages, one of which at least is formed on said lateral casing;
 a flexible bag having an open end and disposed within said chamber, said bag being provided at said open end with a flange placed in contact with said peripheral end surface, the material adjacent the outer surface of the bag being substantially more readily deformable than the material adjacent the inner surface of the bag;
 a cam disposed within said bag and supporting and substantially filling said bag and having a camming profile in area contact with the inner surface of said bag;
 means for clamping said flange against said peripheral end surface, in a fluid-tight relationship including means for fixing said bag against rotational movements;
 and means for rotating said cam about an axis whereby the wall of said bag is subjected to a variable radial deformation in respect of said axis, said deformation producing a variable contact between said wall and said casing.

19. A faucet as claimed in claim 18, wherein said wall consists of two layers of material on at least a portion of its surface.

20. A faucet as claimed in claim 19, wherein the outer of said two layers is relatively thick and made of a flexible resilient material, and the inner of said two layers is relatively thin and consists of a low-friction flexible material.

References Cited by the Examiner

UNITED STATES PATENTS 2,534,577 12/50 Courtot _____ 137—625.4 XR
2,888,952 6/59 Klaren _____ 251—261 XR M. CARY NELSON, *Primary Examiner.*